United States Patent [19]

Mallick

[11] Patent Number: 4,724,541
[45] Date of Patent: Feb. 9, 1988

[54] DATA-DEPENDENT BINARY ENCODER/DECODER

[76] Inventor: Brian C. Mallick, Mark Producing, Inc., 675 Bering Dr., Houston, Tex. 77057

[21] Appl. No.: 758,513

[22] Filed: Jul. 24, 1985

[51] Int. Cl.[4] .............................................. H04L 9/00
[52] U.S. Cl. ...................................... 380/28; 380/43; 380/48
[58] Field of Search ............... 178/22.04, 22.06, 22.10, 178/22.13, 22.14, 22.16, 22.12; 179/1.5 S, 1.5 FS, 1.5 M, 1.5 R; 380/28, 44, 45, 47, 48, 43

[56] References Cited

U.S. PATENT DOCUMENTS

| | | | |
|---|---|---|---|
| 3,798,360 | 3/1974 | Feistel | 178/22 |
| 3,920,894 | 11/1975 | Shirley et al. | 178/22.12 |
| 3,921,151 | 11/1975 | Guanella | 179/1.5 S |
| 4,168,396 | 9/1979 | Best | 178/22 |
| 4,215,421 | 7/1980 | Giraud | 364/900 |
| 4,264,781 | 4/1981 | Oosterbaan et al. | 178/22.10 |
| 4,306,111 | 12/1981 | Lu et al. | 178/22.10 |
| 4,308,617 | 12/1981 | German, Jr. | 380/47 |
| 4,341,925 | 7/1982 | Doland | 178/22.16 |
| 4,375,579 | 3/1983 | Davida et al. | 380/28 |
| 4,388,643 | 6/1983 | Aminetzah | 380/43 |
| 4,431,865 | 2/1984 | Bernede et al. | 178/22.14 |
| 4,433,211 | 2/1984 | McCalmont et al. | 179/1.5 S |
| 4,440,976 | 4/1984 | Bocci et al. | 380/43 |
| 4,484,025 | 11/1984 | Ostermann et al. | 178/22.09 |
| 4,525,844 | 6/1985 | Scheuermann | 179/1.5 S |
| 4,596,898 | 6/1986 | Pemmaraju | 380/45 |
| 4,600,942 | 7/1986 | Field et al. | 178/22.14 |

OTHER PUBLICATIONS

"Thwarting the Information Thieves", *IEEE Spectrum*, by John Horgan, Jul. 1985, especially pp. 38–41.

*Primary Examiner*—Salvatore Cangialosi
*Assistant Examiner*—Aaron J. Lewis

[57] ABSTRACT

Apparatus for the secure transmission of digital data signals is disclosed in which fixed logic gates and a variable bank of logic gates are used in an encoding circuit to scramble the digital data signals with two enciphering words. The resulting scramble signals are then further scrambled by a programmable multiplexer and the output transmitted to a decoding circuit. The decoding circuit, which is responsive to the signal from the encoding circuit, then recreates the original digital data signal.

13 Claims, 2 Drawing Figures

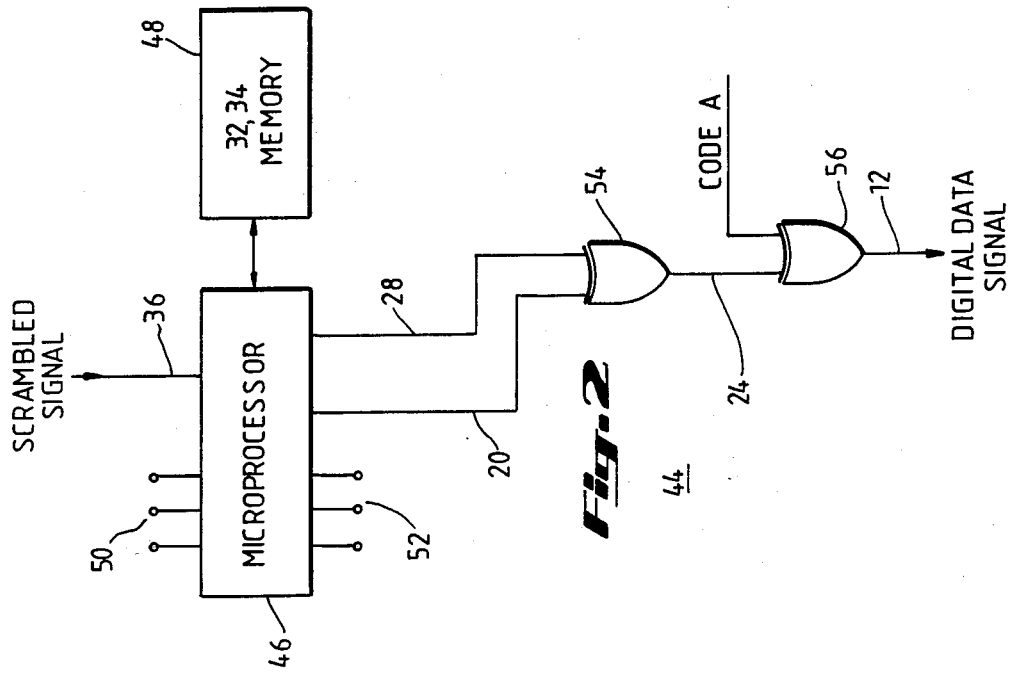
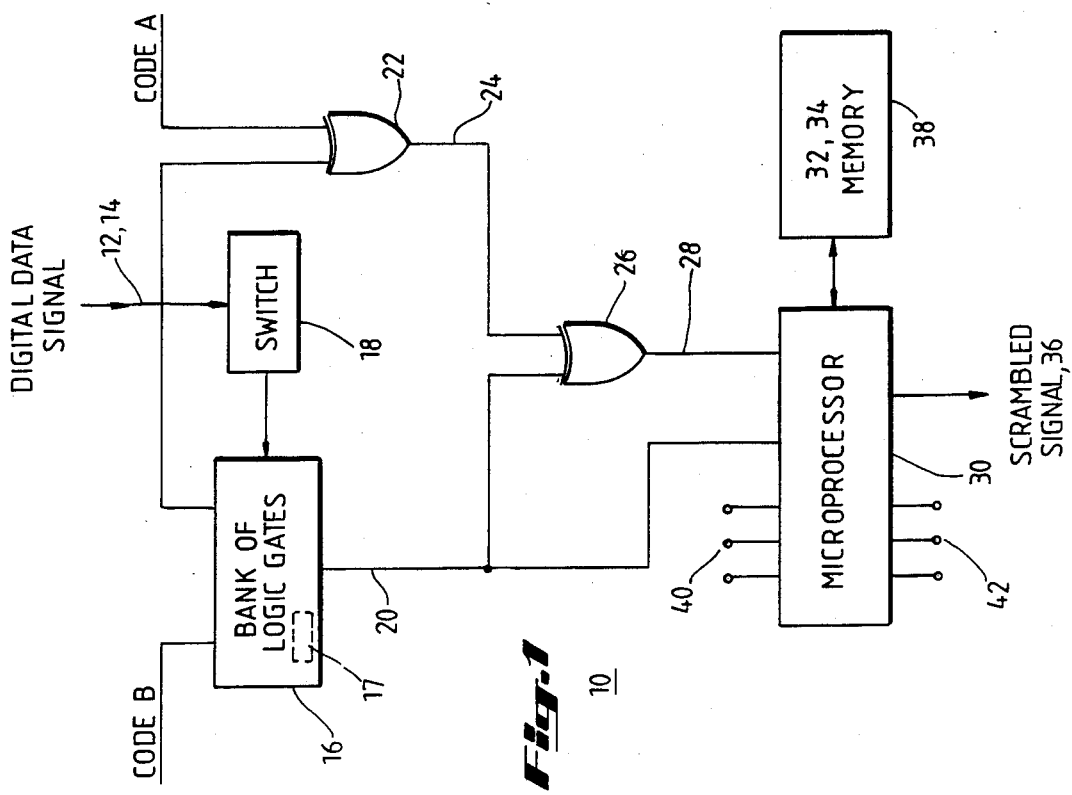

DATA-DEPENDENT BINARY ENCODER/DECODER

BACKGROUND OF THE INVENTION

1. Field of the Invention

This invention relates generally to the secure transmission of digital data signals. More particularly, the present invention relates to encoding and decoding circuits which use exclusive-OR logic gates as part of the scrambling and descrambling process.

2. Description of the Related Art

Simple low-cost stream cipher systems are frequently used for enciphering digital communications data by combining in various ways the message being transmitted with a long stream of quasi-random bits. In such known systems, a required random number generator generates from a cipher key or "seed" a stream of bits. An example of such a system may be found in U.S. Pat. No. 3,911,216 issued Oct. 7, 1975.

In the lates 1970's, the Government proposed the Data Encryption Standard (DES) as a commercial system for encoding data. This algorithm was developed by IBM and refined by the National Security Agency in the early 1970's; it was subsequently promulgated by the National Bureau of Standards.

The DES, like most conventional coding systems, requires that the sender and the receiver have the same secret key, which is used for both encrypting and decrypting messages. The key is generated at a central location and then distributed by some secure means, independent of the communications system that is to be protected, to locations where the key will be used.

Another known prior-art encryption method is monoalphabetic substitution. In such known systems, each byte of the digital data is replaced with a substitute byte. Each byte of the enciphered digital data is deciphered when needed by using a small substitution table which is part of the circuitry on the microprocessor chip. This method has several advantages: it is simple, fast, does not take too much space on the chip, and may proceed in any instruction sequence. Unfortunately, monoalphabetic substitution is not difficult to break, and hence offers little security for the digital data.

Block cipher systems have also been developed for protecting digital information during transmission over communication networks. One known method of providing such security is to use alternating substitution and transportion as described in "Communication Theory of Secrecy Systems" by C. E. Shannon, *Bell Systems Technical Journal*, Vol. 28, pages 711-713, October 1949. Further known teachings on such block cipher systems may be found in "Cryptography and Computer Privacy" by Horst Feistel, *Scientific American*, Vol. 228, No. 5, pages 15-23, May 1973. Known deciphering processors using such a block cipher are secure, but are complex, costly, and somewhat slow.

Another problem with the known prior-art encryption methods is that one person with access to the encoding circuit can transmit data to one other person with the decoding circuit. Thus, one thief at either end of the transmission can take advantage of an innocent person at the other end. That is, a thief can send digital data to an innocent receiver or a thief can receive digital data from an innocent sender. Thus, a system is needed that requires the cooperative effort of persons using the encoding circuit, and the cooperative effort of persons using the decoding circuit.

A system is also needed that will occupy very little physical space and yet will scramble the digital data in a random fashion at a high speed.

SUMMARY OF THE INVENTION

The above-noted and other drawbacks of the related art are overcome by providing a method and apparatus for scrambling digital data signals which features the capability of random, high-speed scrambling using very few circuit components. This is accomplished by using a microprocessor as a programmable multiplexer.

The encoding circuit of the present invention further comprises logic gates which are responsive to two different enciphering words. Thus, the transmission of digital data using the present invention can work as follows. Person A has the responsibility of inputting the digital data. Person B has the responsibility of assigning different enciphering words to Persons C and D. Persons C and D must input their enciphering words into the encoding circuit at their respective terminals when Person A inputs the digital data signals. On the receiving end, Person E has the responsibility of receiving the digital data and Person F has the responsibility of entering a deciphering word into the decoding circuit. Person F receives his deciphering word from Person B. Person B could assign Persons C and D to the proper inputs of the encoding circuit, or a different Person G could be the one to assign Persons C and D to the proper terminals. Unless Persons C and D input the proper enciphering words at the proper terminals, and unless Person F inserts the proper deciphering word, Person E receives a scrambled signal instead of the digital data.

The above-noted and other objects and advantages of the present invention will become more apparent from a detailed description of preferred embodiments when read in conjunction with the drawings.

BRIEF DESCRIPTION OF THE DRAWINGS

The invention will further be described by reference to the accompanying drawings which illustrate particular embodiments of encoding and decoding circuits in accordance with the present invention, wherein like members bear like reference numerals and wherein:

FIG. 1 is a block diagram of an encoding circuit in accordance with the present invention; and FIG. 2 is a block diagram of a decoding circuit in accordance with the present invention.

DESCRIPTION OF PREFERRED EMBODIMENTS

Referring now to the drawings, and in particular to FIG. 1, an encoding circuit 10 according to the present invention is responsive to a digital data signal 12. The digital data signal 12 includes a digital data word 14 of any length, but in the preferred embodiment the length of the digital data word 14 is eight binary bits. The encoding circuit 10 includes a bank 16 of logic gates. The bank 16 can include any number of logic gates, but in the preferred embodiment, four different logic gates are included: an AND gate, a NAND gate, an OR gate, and a NOR gate. In an alternate embodiment, a fifth gate is also included, the fifth gate being an exclusive-OR gate.

A switch 18 is conductively coupled to the bank 16 and is responsive to the first two bits of the digital data signal 12. The four possible combinations of the first two bits correspond to the four different logic gates of the bank 16. The switch is externally adjustable by the user of the encoding circuit so that upon receipt by the switch 18 of a given combination of bits, the switch 18 selects a certain one of the four logic gates to respond to the digital data signal 12. For example, "00" might correspond to the AND gate, "01" might correspond to the NAND gate, "10" might correspond to the OR gate, and "11" might correspond to the NOR gate.

In the preferred embodiment, the first two bits of the digital data signal 12 remain as part of the signal 12. In an alternate embodiment, the first two bits could be used solely to trigger the switch 18, and would not remain as part of the signal 12. However, such an encoding circuit would not generate as random scrambling of the signal 12 as does the preferred embodiment.

Another alternate embodiment of the encoding circuit 12 may have the switch 18 adapted for the operator to manually select one of the four, or five, logic gates. However, such an embodiment would not generate as random scrambling of the signal 12 as does the preferred embodiment.

The bank 16 of logic gates is also responsive to a digital enciphering word CODE B of any length, but in the preferred embodiment the enciphering word CODE B is an eight-bit word. The selected logic gate 17, selected by the switch 18, is responsive to the enciphering word CODE B and the digital data signal 12 and generates an output 20.

The encoding circuit 10 further includes an exclusive-OR logic gate 22 which is responsive to an eight-bit digital enciphering word CODE A and the digital data signal 12. The enciphering word CODE A can be any length of binary bits, but in the preferred embodiment is an eight-bit word. The exclusive-OR logic gate 22 generates an output 24.

An exclusive-OR logic gate 26 is conductively coupled to the bank 16 of logic gates and the exclusive-OR logic gate 22. The exclusive-OR logic gate 26 is responsive to their respective outputs 20 and 24 and generates an output 28.

A microprocessor 30 is conductively coupled to bank 16 and gate 26, and is responsive to their respective signals 20 and 28. In the preferred embodiment, a microprocessor is used. However, any stored program processor can be used. The microprocessor 30 multiplexes signals 20 and 28 with a multiplexing word 32 in a predetermined pattern of multiplexing 34 to generate a scrambled signal 36.

A memory 38 is conductively coupled to the microprocessor 30. The memory 38 stores the multiplexing word 32 and the pattern 34. Any number of multiplexing words and patterns can be stored in the memory. The particular word 32 and the particular pattern 34 used at a particular point in time are each selectively chosen from the stored plurality of words and patterns. In the preferred embodiment at least 7 multiplexing words and at least 8 multiplexing patterns are stored in the memory.

Each multiplexing word 32 is preferably an eight-bit digital word, but could be any length of binary bits. As will be apparent to one skilled in the art, the data signal 12, the enciphering words CODE A and CODE B, and the multiplexing word 32 can all be the same number of bits in length, such as eight in the preferred embodiment, or can each be a different number of bits in length.

The multiplexing pattern 34 specifies how many bits of which word of the three digital words 20, 28, and 32 are to be transmitted first in time, second in time, third in time, etc.

Upon request by the microprocessor 30, the memory 38 transmits a multiplexing word 32 and a multiplexing pattern 34 to the microprocessor. Inputs 40 of the microprocessor are used to select the multiplexing word 32, and inputs 42 are used to select the multiplexing pattern 34. The authorized user of the encoding circuit may choose to use no multiplexing word 32, in which case only the two digital words 20 and 28 are multiplexed.

Referring now to FIG. 2, a decoding circuit 44 according to the present invention is responsive to the scrambled signal 36. The decoding circuit 44 includes a microprocessor 46 which is substantially identical to the microprocessor 30. A memory 48 which is substantially identical to the memory 38 is conductively coupled to the microprocessor 46. Multiplexing patterns 34 and the multiplexing words 32 are stored in the memory 48. The user of the decoding circuit selects a particular multiplexing word 32 at inputs 50 of the microprocessor and selects a multiplexing pattern 34 at the inputs 52 of the microprocessor 46. The microprocessor 46 then transmits a request to the memory 48 for the selected multiplexing word 32 and the selected multiplexing pattern 34. Upon receipt of the multiplexing word 32 and the multiplexing pattern 34 from the memory 48, the microprocessor 46 demultiplexes the scrambled signal 36 to recreate the signals 20 and 28.

An exclusive-OR logic gate 54 is conductively coupled to the microprocessor 46 and is responsive to the recreated signals 20 and 28 to recreate the signal 24. An exclusive-OR logic gate 56 is conductively coupled to gate 54 and is responsive to the encirphering word CODE A and the recreated signal 24, to recreate the digital data signal 12.

The operation of the circuit is as follows. Assume that the digital data signal 12 is the letter P, which is ASCII character 80, which is the binary number 01010000. Assume that the CODE A is the letter A, which is ASCII character 65, which is the binary number 01000001. Assume that the CODE B is the letter B, which is the ASCII character 66, which is the binary number 01000010.

The exclusive-OR logic gate 22 is responsive to the digital data signal 12 and the CODE A and generates an output 24 which is ASCII character 17, which is the binary number 00010001.

Assume that the authorized user of the encoding circuit has secretly adjusted the switch 18 to respond to a "01" binary input signal by selecting an AND gate within the bank of logic gates 16. Since in this example the first two bits of the input digital data signal 12 are "01", the selected logic gate 17 is therefore an AND gate.

In response to the CODE B and the input digital data signal 12, the selected logic gate 17, being an AND gate, generates an output 20 which is the ASCII character 64, which is the binary number 01000000. The exclusive-OR logic gate 26 is responsive to signals 20 and 24 and generates an output 28 which is the binary number 01010001 (which is also Q, ASCII 81).

Assume for the present example that the multiplexing pattern 34 is simply an alternation between the signals 20 and 28. That pattern can be represented by: 20, 28, 20, 28, 20, 28, etc. The authorized user of the encoding circuit 10 has selected this simple multiplexing pattern 34 by applying to the inputs 42 the binary number "000." Assuming that the authorized user of the encoding circuit 10 also wishes to use no multiplexing word 32, he inputs the binary number "000" at the inputs 42 of the microprocessor 30. Therefore, in this example, the microprocessor 30 combines every other bit of the two digital words 20 and 28 starting with the digital word 20, to generate the scrambled signal 36. The scrambled signal 36 is then the 16-bit binary sequence 0011000100000001.

Assuming that the authorized user of the decoding circuit 44 has input the binary number "000" at inputs 50 of the microprocessor 46, no multiplexing word 32 will be used to demultiplex the scrambled signal 36. Also assuming that the authorized user of the decoding circuit 44 has input the binary signal "000" at the inputs 52 of the microprocessor 46, the same multiplexing pattern 34 is selected. Therefore, in response to the scrambled signal 36, the microprocessor 46 recreates the digital words 20 (01000000) and 28 (01010001). The exclusive-OR logic gate 54 is responsive to the two signals 20 and 28 and recreates the signal 24 which is the binary number 00010001. The exclusive-OR logic gate 56 is responsive to the signal 24 and to the CODE A (01000001) and recreates the digital data signal 12 (01010000).

The authorized user of the encoding circuit 12 might decide to change the switch 18 each Monday to help prevent thieves from deciphering the scrambled signal 36. Thus, assume that the authorized user changes the switch 18 so that the binary digits "01" now correspond to an OR gate. Assume further that the digital data signal 12, the CODE A, and the CODE B remain the same. Therefore, the output 24 of the exclusive-OR logic gate 22 is the same: the binary number 00010001.

Since the selected logic gate 17 is now an OR gate, the output 20 is now the binary number 01010010, which is the ASCII character 82, or the letter R. The exclusive-OR logic gate 26 is responsive to the digital words 20 and 24, and generates the digital word 28 which is the binary number 01000011, which is the ASCII character 67, which is the letter C.

Assuming that the authorized user is still not using a multiplexing word 32 and is using the same multiplexing pattern 34, the microprocessor 30 in response to the digital words 20 and 28 generates a scrambled signal 36 which is 0011001000001101. Assuming also that the authorized user of the decoding circuit 44 is using no demultiplexing word 32 and is using the same multiplexing pattern 34 as used in the previous example, the microprocessor 52 is responsive to the scrambled signal 36 and recreates the digital words 20 (01010010) and 28 (01000011). The exclusive-OR logic gate 54 is responsive to the digital words 20 and 28 and recreates the digital word 24 (00010001). The rest of the operation of the decoding circuit 44 is the same as in the previous example, and thus the digital data signal 12 is recreated.

As will be apparent to those skilled in the art, the authorized user of the encoding circuit will rarely choose to use no multiplexing word 32, and will rarely choose to use such a simple multiplexing pattern 34 as in the above examples. Assume, for example, that the binary digits "001" applied to the word select inputs 40 in the encoding circuit 10 and to the word select inputs 50 in the decoding circuit 44, select from the respective memories 38 and 48 the following eight-bit digital word 32: 10101011. Assume further that the digital words 20 and 28 are the same as in the first example. That is, the digital word 20 is a binary number 01000000, and the digital word 28 is the binary number 01010001. Assume further that the multiplexing pattern 34 is as shown below in Table I.

TABLE I

| Step 1.  | digital word 20: 1 bit selected:  | 0       |
|----------|-----------------------------------|---------|
| Step 2.  | digital word 28: 3 bits selected: | 010     |
| Step 3.  | digital word 32: 2 bits selected: | 10      |
| Step 4.  | digital word 20: 4 bits selected: | 1000    |
| Step 5.  | digital word 28: 1 bit selected:  | 1       |
| Step 6.  | digital word 32: 3 bits selected: | 101     |
| Step 7.  | digital word 20: 3 bits selected: | 000     |
| Step 8.  | digital word 28: 1 bit selected:  | 0       |
| Step 9.  | digital word 32: 1 bit selected:  | 0       |
| Step 10. | digital word 20: 0 bits selected: | NOTHING |
| Step 11. | digital word 28: 3 bits selected: | 001     |
| Step 12. | digital word 32: 2 bits selected: | 11      |

The operation of the multiplexing pattern 34 as shown in Table I is as follows. The microprocessor 30 generates the following stream of digits. At step 1 of Table I, the microprocessor 30 generates the binary digit "0". At step 2 the microprocessor generates the three digits "010." This continues through all 12 steps to produce the 24-bit stream: 001010100011010000000111.

Assuming that the authorized user of the decoding circuit 34 has selected the same digital word 32 (10101011) and the same multiplexing pattern 34 shown in Table I, the microprocessor 46 is responsive to the scrambled signal 36 and generates the digital words 20 and 28.

As will be apparent to those skilled in the art, a variety of complex multiplexing patterns 34 can be devised by the authorized users of the encoding and decoding circuits. Furthermore, the enciphering words CODE A and CODE B can be changed at will by the authorized users.

In the foregoing examples, the encoding circuit 10 and the decoding circuit 44 both operate at identical clocks, and a timing waveform, T, used with the multiplexing pattern 34 in the microprocessor 30 is identical to that used with the multiplexing pattern 34 in the microprocessor 46. It will be apparent to those skilled in the art that a first timing waveform T1 can be used in conjunction with a first multiplexing pattern 34a in the microprocessor 30 when a second timing waveform T2 is used in conjunction with a second multiplexing pattern 34b in the microprocessor 46, the waveforms T1 and T2 not being identical and the multiplexing patterns 34a and 34b not being identical. In this alternate embodiment, the first multiplexing pattern 34a and the first timing waveform T1 are used by the microprocessor 30 to operate at a multiplexing pattern 35a which gives the same result as obtained in the previous examples when using the multiplexing pattern 34 and the timing waveform T. And, similarly, the second multiplexing pattern 34b and the second timing waveform T2 are used by the microprocessor 46 to operate at a demultiplexing pattern 35b which gives the same result as obtained in the previous examples when using the multiplexing pattern 34 and the timing waveform T.

Similarly, the encoding circuit 10 may use a first multiplexing word 32a when the decoding circuit 44 uses a second multiplexing word 32b different from the first. In this alternate embodiment, the microprocessor 30 uses the first multiplexing word 32a, the first multiplexing pattern 34a and the first timing waveform T1 to operate at a multiplexing pattern 35c which gives the same result as obtained in the previous examples when using the multiplexing word 32, the multiplexing pattern 34 and the timing waveform T. And, similarly, the microprocessor 46 uses the second multiplexing word 32b, the second multiplexing pattern 34b and the second timing waveform T2 to operate at a demultiplexing pattern 35d which gives the same result as obtained in the previous examples when using the multiplexing word 32, the multiplexing pattern 34 and the timing waveform T.

From the foregoing description of the operation of the invention, it can be seen that the present invention requires few circuit components, and yet offers the authorized users a wide range of ways to scramble their digital data transmissions.

The principles, preferred embodiments and modes of operation of the present invention have been described in the foregoing specification. The invention is not to be construed as limited to the particular forms disclosed, since these are regarded as illustrative rather than restrictive. Moreover, variations and changes may be made by those skilled in the art without departing from the spirit of the invention.

What is claimed is:

1. Apparatus for secure data transmission, said apparatus being adapted to receive an input digital data signal, said apparatus comprising:
   an encoding circuit for receiving said input digital data signal and first and second digital enciphering words and for transmitting scrambled signals, said encoding circuit including:
   a bank of logic gates responsive to said data signal and said first enciphering word for generating a first output through a preselected one of said logic gates;
   a switch conductively coupled to said bank of logic gates, said switch responsive to said data signal for preselecting one of said logic gates to respond to said data signal and said first enciphering word;
   a first exclusive-OR logic gate responsive to said data signal and said second enciphering word for generating a second output;
   a second exclusive-OR logic gate conductively coupled to said bank of logic gates and said first exclusive-OR logic gate, responsive to said first and second outputs, for generating a third output;
   a first stored program processor conductively coupled to said bank of logic gates and said second exclusive-OR logic gate, and responsive to said first and third outputs for multiplexing in one of a plurality of predetermined patterns said first and third outputs with one of a plurality of predetermined digital multiplexing words to generate a scrambled signal for said secure transmission, said first stored program processor having means for selective designation of said one predetermined pattern and of said one predetermined multiplexing word; and
   a first memory conductively coupled to said first stored program processor for storing said plurality of predetermined patterns and said plurality of predetermined digital multiplexing words, and transmitting said one predetermined pattern and said one predetermined word to said first stored program processor in response to a request by said first stored program processor; and
   a decoding circuit for receiving said scrambled signal and a third enciphering word, said third enciphering word being identical to one of said first and second enciphering words, and for recreating said input digital data signal, said decoding circuit including:
   a second memory conductively coupled to a second stored program processor for storing said plurality of predetermined patterns and said plurality of predetermined digital multiplexing words, and for transmitting said one predetermined pattern and said one predetermined word to said second stored program processor in response to a request by said second stored program processor; and
   said second stored program processor responsive to said scrambled signal for demultiplexing said scrambled signal to generate said first and third outputs, said second stored program processor having means for selective designation of said one predetermined pattern and of said one predetermined multiplexing word for use in demultiplexing said scrambled signal;
   a third exclusive-OR logic gate conductively coupled to said second stored program processor and responsive to said first and third outputs from said second stored program processor, to generate said second output; and
   a fourth exclusive-OR logic gate conductively coupled to said third gate, and responsive to said third enciphering word and said second output from said third gate to generate said digital data signal.

2. The apparatus according to claim 1 wherein said switch selects one of said logic gates in response to the first two bits of said input digital data signal.

3. The apparatus according to claim 2 wherein said bank of logic gates includes four logic gates.

4. The apparatus according to claim 1 wherein said switch is selectively manually operable.

5. The apparatus according to claim 4 wherein said bank of logic gates includes five logic gates.

6. Apparatus for secure data transmission, said apparatus being adapted to receive an input digital data signal, said apparatus comprising:
   an encoding circuit for receiving said input digital data signal and first and second digital enciphering words and for transmitting scrambled signals, said encoding circuit including:
   a bank of logic gates responsive to said data signal and said first enciphering word for generating a first output through a preselected one of said logic gates;
   a switch conductively coupled to said bank of logic gates, said switch responsive to said input digital data signal for preselecting one of said logic gates to respond to said data signal and said first enciphering word;
   a first exclusive-OR logic gate responsive to said data signal and said second enciphering word for generating a second output;
   a second exclusive-OR logic gate conductively coupled to said first logic gate and said bank of logic gates, responsive to said first and second outputs, for generating a third output;

a stored program processor conductively coupled to said bank of logic gates and said second logic gate, and responsive to said first and third outputs for multiplexing in a first predetermined pattern said first and third outputs with a first predetermined digital multiplexing word to generate a scrambled signal for said secure transmission; and a decoding circuit for receiving said scrambled signal and a third enciphering word and for recreating said input digital data signal, said decoding circuit including:

a stored program processor responsive to said scrambled signal for demultiplexing said scrambled signal to generate said first and third outputs, said stored program processor being responsive to a second predetermined pattern and a second predetermined multiplexing word;

a third exclusive-OR logic gate conductively coupled to said stored program processor and responsive to said first and third outputs from said stored program processor, to generate said second output; and a fourth exclusive-OR logic gate conductively coupled to said third logic gate, and responsive to said third enciphering word and said second output from said third logic gate to generate said digital data signal.

7. The apparatus according to claim 6 wherein said switch selects one of said logic gates in response to the first two bits of said input digital data signal.

8. The apparatus according to claim 6 wherein one of said encoding circuit and said decoding circuit further comprises a first memory conductively coupled to said stored program processor for storing a first pattern group having at least one predetermined multiplexing pattern and a first word group having at least one predetermined multiplexing word, and for transmitting to said stored program processor one pattern of said first pattern group and one word of said first word group.

9. The apparatus according to claim 8 wherein the other of said encoding circuit and said decoding circuit further comprises a second memory conductively coupled to said stored program processor for storing a second pattern group having at least one predetermined multiplexing pattern and a second word group having at least one multiplexing word, and for transmitting to said stored program processor one pattern of said second pattern group and one word of said second word group.

10. The apparatus according to claim 9 wherein said first predetermined pattern is identical to the one pattern of the first pattern group, said second predetermined pattern is identical to the one pattern of the second pattern group, said first predetermined digital multiplexing word is identical to the one word of the first word group, and said second predetermined digital multiplexing word is identical to the one word of the second word group.

11. The apparatus according to claim 10 wherein the one pattern of the first pattern group is identical to the one pattern of the secone pattern group, and the one word of the first word group is identical to the one word of the second word group.

12. The apparatus according to claim 9 wherein the stored program processor of said encoding circuit operates according to a first timing waveform and the stored program processor of said decoding circuit operates according to a second timing waveform different from said first timing waveform.

13. A method for enciphering and deciphering digital data signals wherein said enciphering comprises the steps of:

I. preselecting one logic gate of a bank of logic gates to respond to the digital data signals and to a first enciphering word;

II. generating a first output through said one of said logic gates;

III. generating a second output through a first exclusive-OR logic gate responsive to said digital data signal and to a second enciphering word;

IV. generating a third output through a second exclusive-OR logic gate, said generating in response to said first and second outputs;

V. selecting a predetermined pattern and a predetermined digital word from a first memory;

VI. multiplexing in said predetermined pattern said first and third outputs with said predetermined digital word to generate a scrambled signal;

and said deciphering comprises the steps of:

I. selecting a third enciphering word identical to one of said first and second enciphering words;

II. selecting said predetermined pattern and said predetermined digital word from a second memory;

III. demultiplexing said scrambled signal with said predetermined word in said predetermined pattern to generate said first and third outputs;

IV. generating said second output through a third exclusive-OR logic gate, said generating in response to said first and third outputs;

V. generating said digital data signal through a fourth exclusive-OR logic gate, said generating in response to said third enciphering word and said second output.

* * * * *

UNITED STATES PATENT AND TRADEMARK OFFICE
CERTIFICATE OF CORRECTION

PATENT NO.    : 4,724,541
DATED         : February 9, 1988
INVENTOR(S)   : Brian C. Mallick It is certified that error appears in the above-identified patent and that said Letters Patent are hereby corrected as shown below:

In column 4, line 36; please replace "encirphering" with --enciphering--.

In Claim 11, line 3; please replace "secone" with --second--.

Signed and Sealed this

Twelfth Day of July, 1988

Attest:

DONALD J. QUIGG

Attesting Officer

Commissioner of Patents and Trademarks